United States Patent [19]
Dötsch et al.

[11] Patent Number: 5,225,247
[45] Date of Patent: Jul. 6, 1993

[54] PROCESS FOR PRODUCING A GAS PURGING PLUG WITH INCREASED RESISTANCE TO INFILTRATION AND ORIENTED POROSITY

[75] Inventors: Lorenz Dötsch, Vallendar; Helmut Preyer, Kurtscheid; Frich Renfordt, Urmitz; Jean-Louis Retrayt, Neuwied, all of Fed. Rep. of Germany

[73] Assignee: Radex-Heraklith Industriebeteiligungs Aktiengesellschaft, Vienna, Austria

[21] Appl. No.: 731,452

[22] Filed: Jul. 17, 1991

[30] Foreign Application Priority Data

Jul. 19, 1990 [DE] Fed. Rep. of Germany ....... 4022949

[51] Int. Cl.⁵ .......................... B05D 3/00; B05D 3/02

[52] U.S. Cl. .................................. 427/294; 264/29.1; 264/4; 427/300; 427/314

[58] Field of Search ............... 427/190, 287, 294, 300, 427/372.2, 443.2, 314; 264/43, 29.1

[56] References Cited

U.S. PATENT DOCUMENTS

2,911,319 11/1959 Peter .................................. 427/294
4,851,264 7/1989 Banerjee et al. .................... 427/294

Primary Examiner—Jan H. Silbaugh
Assistant Examiner—Christopher A. Fiorilla
Attorney, Agent, or Firm—John F. A. Earley; John F. A. Earley, III

[57] ABSTRACT

A process for producing a plug with increased resistance to infiltration and oriented porosity for use in metallurgical melting crucibles, in which the matrix material of the plug is subjected to an impregnating treatment.

22 Claims, No Drawings

PROCESS FOR PRODUCING A GAS PURGING PLUG WITH INCREASED RESISTANCE TO INFILTRATION AND ORIENTED POROSITY

The present invention pertains to a process for producing a gas purging plug with increased resistance to infiltration and oriented porosity for use in metallurgical melting crucibles.

Such plugs, which are used to feed gases and/or solids into metallurgical melts, have been known for a long time. A comprehensive review was published in *RADEX-Rundschau*, 1987, p. 288. Especially gas plugs with "oriented porosity" have recently become successful. These plug elements are characterized by canals inside the refractory ceramic matrix material, which extend from the gas feed side to the gas discharge side.

The canals are supplied with gas from a central gas feed line, but, if desired, also with gas/solid mixtures.

Even though such ga plugs have proved successful on a large scale for several years, the wish to have gas purging elements with increased resistance to infiltration against metallurgical melts was also expressed within the framework of increasing quality requirements.

Correspondingly, the object of the present invention is to offer a gas plug with oriented porosity and to provide a corresponding production process which leads to plugs with increased resistance to infiltration.

The present invention is based on the discovery that improved resistance to infiltration can be achieved especially by impregnating the matrix material of the plug (outside the pore canals). It was recognized in the present invention that special measures must be taken for this purpose in order to prevent the infiltrating medium from infiltrating into the open pore canals of the prefabricated plug with oriented porosity.

In its general embodiment, the present invention describes a process possessing the characteristics of claim 1. Advantageous embodiments are described in the subclaims as well as the other application documents.

The process is based on a plug with oriented porosity manufactured in the conventional manner.

Depending on the manufacturing process (cast or pressed plug), it may be necessary to subsequently temper the plug (e.g., at temperatures between 350° C. and 900° C.), fire (usually above 1200° C.), or first to temper and then to fire.

The plug is subsequently subjected to an impregnating treatment, for which it is important for the pore canals to be temporarily filled with a material during the impregnating treatment, so that the impregnating medium can penetrate only into the open pore volume of the matrix material, and fills it at least partially, whereas it does not penetrate into the pore canals, because these are filled with the material during the impregnating treatment.

The impregnating treatment is preferably carried out by applying pressure and/or vacuum in a corresponding treating vessel, in which the plugs are, e.g., immersed.

If, for example, pitch or tar is used as the impregnating medium, it is necessary to subsequently expel the volatile components, and the plug should therefore subsequently be at least tempered. The pore canals remain temporarily filled with the material during this process step as well, so that the impregnating medium also cannot penetrate into the pore canals and clog them.

The material is removed from the pore canals only thereafter. The impregnated plug is now ready to use; however, if necessary, it can also be subsequently fired, especially if it was not fired before.

The present invention suggests different alternative embodiments for carrying out the impregnating treatment.

Besides the above-mentioned impregnating with tar or pitch, which can usually be carried out at temperatures between 150° C. and 250° C., it is also possible to carry out a mechanical/physical impregnating treatment.

It was observed that in the cold state, a slip possessing thixotropic properties can be transformed, like, e.g., heated pitch, into a state of rather low viscosity. Depending on the selection of the components of the slip, its viscosity can be lowered to the extent that the open pore volume of the matrix material of the plug will be filled more or less completely before—after turning off a corresponding mechanical/physical exciting unit—the slip again begins to stiffen because of its thixotropic properties and will subsequently reliably fill the open pore volume (with the exception of the pore canals).

The thixotropic slip is selected on the basis of the following criteria:

The particle size of the solid component of the slip must be adapted to the size of the pores to be filled, i.e., it must be smaller. In the preferred range, the average particle size of the solid component of the slip should be 1/5 and preferably up to 1/10 of the average diameter of the open pores of the matrix material of the plug. The finer the slip material, the more completely is it able to fill even finer pores. At an average pore diameter of, e.g., 30 microns, the solid component should be in the particle fraction below 3 microns.

The refractory component is preferably a ceramic component, which is basic if the matrix material of the plug is basic, and acidic if an acidic matrix material is available. Micronized corundum or fine particulate magnesite can be mentioned as examples. It is, of course, also possible to use amphoteric materials.

For its processing, the slip also has, besides the refractory ceramic component, a structure-building and/or liquid component, which should contain carbon and may consist of, e.g., a resin. The carbon component of the resin undergoes cracking during a subsequent temperature treatment (tempering) and forms a carbon skeleton for the refractory ceramic particles, which leads to an increase in stability for the impregnating medium.

The slip preferably contains an additive which improves the thixotropic properties. These additives include, e.g., methylcellulose, but other wetting agents as well, such as alkyl, aryl, polyoxyethanol.

The mechanical/physical exciting units provided for liquefying the thixotropic slip may be, e.g., mechanical vibrators or ultrasonic devices. Thus, the products to be impregnated can be placed, e.g., into a slip-filled tank. Then, either the entire device is moved (vibrated), or the slip is subjected to physical effect via an ultrasonic device, so that the thixotropic skeleton of the slip will collapse, and the slip will be able to penetrate into the open pore volume. The impregnation can be additionally assisted by a pressure/vacuum device as is known from the state of the art.

The advantage of this impregnation process is that the impregnation takes place in the cold state, e.g., at room temperature. This makes it possible to save money. A subsequent tempering to evaporate the volatile components may be omitted. Emissions causing environmental pollution do not occur.

However, as was described above, it is also possible to use tar or pitch impregnation processes which are known in another connection, e.g., for refractory ceramic bricks.

As was described, the pore canals must be filled during the impregnating treatment as well as the tempering that may be subsequently performed in order to prevent impregnating medium from penetrating into and clogging them. Various materials may be used to fill the pore canals. However, the material must be selected such that no nondetachable connection shall take place between the material and the ceramic matrix material of the plug. The following examples can be mentioned: powdered, inert materials which are filled into the pore canals, while the open ends of the pore canals are sealed, e.g., by placing over a plate. However, it is also possible to use bar- or strip-shaped elements, e.g., those made of paper, cardboard, plastic, or metal. To facilitate the subsequent extraction of these elements, their surface may be coated with a lubricant, e.g., wax, paraffin, oil, or graphite. The cross section of these elements should be equal to or slightly smaller than the cross section of the pore canals, so that they fill the pore canals completely, on one hand, but can subsequently be easily removed, on the other hand. To extract the elements, it may be advantageous, depending on the material used, to preheat them. Inductive heating proved to be particularly advantageous in the case of metallic elements.

The process according to the present invention makes it possible to produce plugs with oriented porosity which have markedly increased resistance to infiltration compared with prior-art purging elements of the same class. In the case of pressed plugs, and especially isostatically pressed plugs, the mechanical stability and the resistance to infiltration are additionally improved because of the higher density of the matrix material.

We claim:

1. Process for producing a gas purging plug with increased resistance to infiltration and with oriented porosity for use in metallurgical melting crucibles, comprising the following steps:
   1.1 manufacturing a plug having open pores from a refractory ceramic matrix material and forming oriented pore canals which extend between a gas inlet end of the plug and a gas discharge end at an opposite end of the plug;
   1.2 tempering or firing, or tempering and firing the plug;
   1.3 temporarily filling the oriented pore canals with temporary material, subjecting the plug to an impregnating treatment, during which the oriented pore canals are temporarily filled with the temporary material, and penetrating the open pores of the ceramic matrix material and filling them at least partially with an impregnating material;
   1.4 tempering the impregnated plug if desired, and
   1.5 removing the temporary material from the oriented pore canals.

2. Process in accordance with claim 1, in which a pressed plug is used as the plug.

3. Process in accordance with claim 2, in which an isostatically pressed plug is used as the plug.

4. Process in accordance with claim 1, in which the tempering is carried out at a temperature between 350° C. and 900° C. prior to the impregnating treatment.

5. Process in accordance with claim 1, in which a slip which possesses thixotropic properties and consists of a fine particulate refractory ceramic material and a carbon-containing component is used as the impregnating material.

6. Process in accordance with claim 5, characterized in that a slip whose solids content is at least 40 wt.% is used as the impregnating material.

7. Process in accordance with claim 5, said pores having an average pore diameter and characterized in that a slip whose solid component has a maximum particle size corresponding to 1/5 of the average pore diameter of the plug is used as the impregnating material.

8. Process in accordance with claim 7, characterized in that a slip whose solid component has a maximum particle size corresponding to 1/10 of the average pore diameter of the plug is used as the impregnating material.

9. Process in accordance with claim 5, characterized in that a slip containing a thixotropy-inducing agent is used as the impregnating material.

10. Process in accordance with claim 9, characterized in that a methylcellulose is used as the thixotropy-inducing agent.

11. Process in accordance with claim 5, characterized in that a resin, e.g., a phenolic resin or a novolac resin, is used as the carbon-containing component.

12. Process in accordance with claim 5, characterized in that the refractory component of the impregnating medium for a plug made from a basic matrix material is basic and that for a plug made from an acidic matrix material is acidic.

13. Process in accordance with claim 5, in which the slip is liquefied by means of a mechanical and/or physical exciting unit and introduced into the open pores of the plug, by applying pressure and/or vacuum if desired, and the exciting unit is turned off after reaching the predetermined degree of filling of the pores, and the impregnating agent begins to stiffen at the same time.

14. Process in accordance with claim 1, characterized in that a carbon-containing component is used as the impregnating medium.

15. Process in accordance with claim 14, in which pitch or tar is used as the impregnating material.

16. Process in accordance with claim 14, characterized in that the impregnating material is introduced into the open pores of the matrix material of the plug in viscous form under pressure and/or vacuum.

17. Process in accordance with claim 1, characterized in that the impregnated plug is tempered at a temperature at which the volatile components of the impregnating material evaporate.

18. Process in accordance with claim 1, characterized in that the pore canals are filled with a corresponding heat-resistant material during the impregnating treatment as well as the subsequent tempering.

19. Process in accordance with claim 1, in which during the impregnating treatment and the subsequent tempering that may be performed, the pore canals are closed with bar-shaped or strip-shaped elements, which are subsequently extracted.

20. Process in accordance with claim 19, characterized in that the bar-shaped or strip-shaped elements are heated prior to extraction.

21. Process in accordance with claim 15, characterized in that the impregnating material is introduced into the open pores of the matrix material of the plug in viscous form under pressure and/or vacuum.

22. A process of producing a plug with increased resistance to infiltration and with oriented porosity for use in metallurgical melting crucibles, comprising the steps of manufacturing a plug with open pores from a refractory ceramic matrix material, forming a gas inlet end and a gas discharge end in the plug and oriented pore canals in the plug extending between said gas inlet end and said gas discharge end, tempering the plug, firing the plug, filling the pore canals of the plug temporarily with a temporary material, applying an impregnating material to the plug, penetrating the open pores of the matrix material of the plug with the impregnating material, filling the open pores of the matrix material at least partially with the impregnating material, tempering the impregnated plug, and removing the temporary material from the pore canals, isostatically pressing the plug, the tempering of the plug prior to the filling of the pore canals with the temporary material being carried out at a temperature between 350° C. and 900° C., wherein the impregnating material is a slip which possesses thixotropic properties and which consists of a fine particulate refractory ceramic material in a carbon-containing component, the slip having a solids content of at least 40 wt.%, the solids content of the slip having a maximum particle size corresponding to 1/10 of the average pore diameter of the pores of the plug, the slip containing a thixotropic-inducing agent, said thixotropic-inducing agent being a methylcellulose, the carbon-containing component of the slip being a phenolic resin or a novolac resin, the fine particulate refractory ceramic material of the impregnating material being basic if the matrix material of the plug is basic, and the refractory ceramic material of the impregnating material being acidic if the matrix material of the plug is acidic.

* * * * *